April 20, 1926.
W. J. VOELKER
1,581,146
ADJUSTABLE FURNACE PIPE ELBOW
Filed April 22, 1925
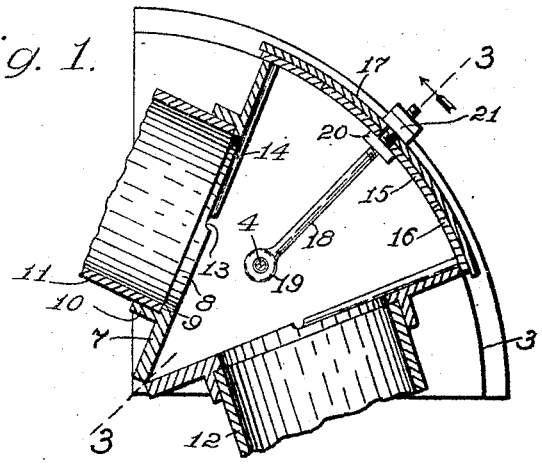
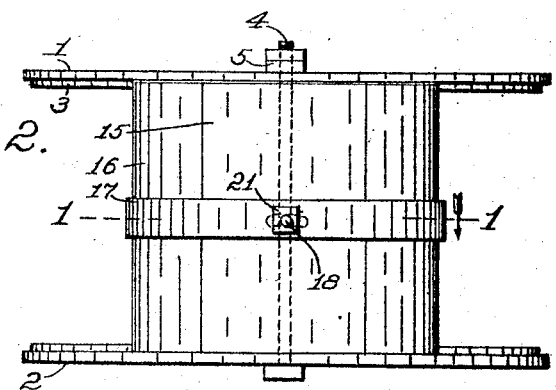
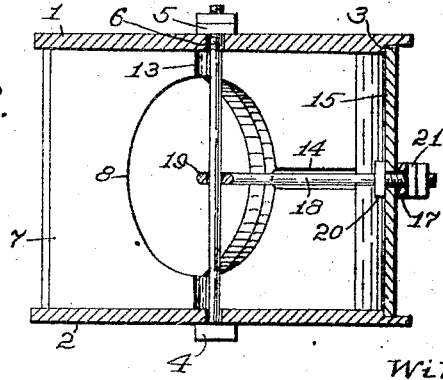
Inventor
William J. Voelker.
By Patented Apr. 20, 1926.

1,581,146

UNITED STATES PATENT OFFICE.

WILLIAM J. VOELKER, OF WATERLOO, IOWA.

ADJUSTABLE FURNACE-PIPE ELBOW.

Application filed April 22, 1925. Serial No. 25,047.

*To all whom it may concern:*

Be it known that I, WILLIAM J. VOELKER, a citizen of the United States, residing at Waterloo, in the county of Black Hawk and State of Iowa, have invented certain new and useful Improvements in Adjustable Furnace-Pipe Elbows, of which the following is a specification.

My invention relates to improvements in adjustable furnace-pipe elbows, and the object of my improvement is to supply an elbow device which in its structural composition is particularly suitable for use with parts of a furnace flue, and for adjustment at different angles to each other of said parts or which may be used as a straight coupling therefor.

This object I have accomplished by the means which are hereinafter described and claimed, and which are illustrated in the accompanying drawings, in which Fig. 1 is a horizontal section of my device taken on the broken line 1—1 of Fig. 2. Fig. 2 is an elevation of the device, and Fig. 3 is a transverse section of the device taken on the broken line 3—3 of said Fig. 1, in the direction of the arrow.

It is to be understood that changes in the precise embodiment of invention herein disclosed can be made within the scope of what is claimed without departing from the spirit of the invention.

The different elements of my device are preferably as shown made of relatively thick and enduring materials, such as iron castings, in order to withstand for a long time without perceptible injury the corrosive action of intense heat and of the gases of combustion, when used for the smoke-pipe of a furnace.

The device has like segmental top and bottom plates 1 and 2, two edges meeting at a suitable angle while a third edge is arcuate. Each plate has an arcuate shoulder 3 spaced from its arcuate edge, and this shoulder should be preferably an arc of a circle on a radius taken from the apex of the angularly meeting edges. The plates 1 and 2 are spaced in the same alinement but respectively reversed with their shoulders 3 opposite each other.

The numeral 7 is used to denote a pair of like shaped adjustable plates respectively reversed in position, which are mounted between and engaged between the said plates 1 and 2 edgewise, the plates 1 and 2 having opposite apertures 6 to receive a headed and threaded bolt 4, and fastened by nuts 5, to clamp the plates 1 and 2 upon opposite edges of the rectangular plates 7. Each plate 7 has on its outer face an annular flange 10 which is spaced from a circular concentric aperture 8 in the plate to provide the annular seat stop 9 for a part of a furnace smoke-pipe as at 11 or 12, to seat the end of either within said flanges to fit tightly therein. Two abutting edges of the plates 7 are brought into angular contact at or near the angles of the straight edges of the plates 1 and 2. It will be seen that if the plates 7 are placed with their inner faces in contact, their annular flanges 10 will seat the pipe parts 11 and 12 in a straight line. To permit this, the inner faces of the plates 7 are grooved at 13 across leading radially away from the central apertures 8 so that when the plates are closed into registering contact the grooves 13 inclose the bolt 4 between the plates 1 and 2. The plates 7 may be swung apart to a desired angle, as the plates 1 and 2 may be of a different or wider angle than the right angle shown. I employ closing means for the separated edges of the plates 7.

An arcuate plate 15, with one or more similar arcuate plates 16 ranged therewith in edgewise contact if necessary, are mounted between the plates 1 and 2 loosely, and in fitting contact for sliding adjustments therealong with the shoulders 3, which also serve as abutments or stops against displacements of these plates inwardly and to keep them alined.

Across the outer wall of the parts 15 and 16 is positioned an arcuate bar 17 of a suitable length to retain the said wall parts in place, the middle part 15 and the bar 17 being apertured in registration to pass the threaded end of a headed bolt 18 having a nut 20 to engage the inner wall of said part 15, and nuts as at 21 secure the bar 17 clampingly upon the wall parts 15 and 16 to hold them against the shoulder 3. The annular head or eye 19 of said bolt 18 receives said bolt 4 as an anchoring means. The outer vertical edges of the plates 7 contact with the inner wall formed by the parts 15 and 16, in line between the shoulders 3, so that tight joints are provided between these parts when the plates 1 and 2 are clamped together.

To permit the plates 7 to contact as above stated so as to seat the pipe parts 11 and 12 in a straight alinement, other radially disposed grooves are located on the inner faces of the plates 7 at 14, as shown in Figs. 1 and 3.

With this device any connection of two pipe sections may be made, either a straight connection, or at any angle to either within the limits of the plates 1 and 2, which latter may be shaped in any desired way for that purpose. In order to clean out the elbow, it is only necessary to loosen the nuts 21 enough to permit the withdrawal of one or more of the plates 16, or 15, when the nuts are removed, as it is unnecessary to loosen the top nuts 5 which clamp the plates 1 and 2 upon the wall plates 7. The plates 15 and 16 are a little loose between the plates 1 and 2, as they are tightly jointed against the shoulders 3 when the nuts 21 are seated. The different plates of the device are so fitted and clamped together as to not require calking at their joints, for the pivotal edges of the plates 7 meet at sharp angles at all positions of relative adjustments except when contacting and parallel for a straight connection.

This device may therefore be used for effecting the connections desired relative to a furnace and a building flue. The invention also may be employed in connecting pipe sections for any other installations desired.

Having described my invention, what I claim as new, and desire to secure by Letters Patent, is:

1. A device of the character described, comprising top and bottom plates, a pair of swinging plates separably clamped therebetween for adjustments to and from each other from a parallel contact to angular separation from each other with abutting end angles of both contacting as a hinge joint, and wall sections for the interspace of the opposite edges of said pair, said top and bottom plates having on their opposed faces opposed shoulders to seat and stop said wall sections, means for detachably clamping said top and bottom plates upon said swinging plates, and other means for detachably anchoring said wall plates to said clamping means and to releasably clamp the wall plates to said shoulders, when the assemblage of plates have been arranged for a desired relative adjustment, to connect pipe sections, the said swing plates having apertured seats for said pipe sections.

2. A device of the character described, comprising top and bottom plates, a pair of swinging plates separably clamped therebetween for adjustments to and from each other from a parallel contact to angular separation from each other with abutting end angles of both contacting as a hinge joint, a wall section for the interspace of the opposite edges of said pair and contacting therewith, means for detachably clamping said top and bottom plates upon said swinging plates, and means for detachably clamping said wall section upon contacting edges of said swinging plates and top and bottom plates, when these have been arranged in a relative adjusted assemblage, the swinging plates having apertured seats for pipe ends.

In testimony whereof I affix my signature.

WILLIAM J. VOELKER.